United States Patent
Reissing et al.

(10) Patent No.: US 11,865,949 B2
(45) Date of Patent: Jan. 9, 2024

(54) ASSEMBLY FOR SECURING AN ELECTRICAL EXTERNAL POWER SUPPLY CONNECTOR

(71) Applicant: SIEMENS MOBILITY GMBH, Munich (DE)

(72) Inventors: Norbert Reissing, Regensburg (DE); Michael Schwerin, Graefenberg (DE); Marc Zeltner, Reichenschwand (DE)

(73) Assignee: Siemens Mobility GmbH, Munich (DE)

( * ) Notice: Subject to any disclaimer, the term of this patent is extended or adjusted under 35 U.S.C. 154(b) by 441 days.

(21) Appl. No.: 17/264,928

(22) PCT Filed: Jul. 9, 2019

(86) PCT No.: PCT/EP2019/068393
§ 371 (c)(1),
(2) Date: Feb. 1, 2021

(87) PCT Pub. No.: WO2020/025264
PCT Pub. Date: Feb. 6, 2020

(65) Prior Publication Data
US 2021/0316615 A1    Oct. 14, 2021

(30) Foreign Application Priority Data
Jul. 30, 2018    (DE) .......................... 102018212674.7

(51) Int. Cl.
*H01R 13/44*    (2006.01)
*B60L 9/00*    (2019.01)
(Continued)

(52) U.S. Cl.
CPC .................. *B60L 9/00* (2013.01); *B61C 3/00* (2013.01); *B61C 17/00* (2013.01); *H01R 13/447* (2013.01);
(Continued)

(58) Field of Classification Search
CPC .......... B60L 9/00; B60L 2200/26; B61C 3/00; B61C 17/00; H01R 13/447; H01R 2201/26; H01R 13/6397
See application file for complete search history.

(56) References Cited

U.S. PATENT DOCUMENTS

| 1,607,121 A | 11/1926 | Doran |
| 4,603,931 A | 8/1986 | Ruffman |

(Continued)

FOREIGN PATENT DOCUMENTS

| CN | 101405166 A | 4/2009 |
| CN | 102275508 A | 12/2011 |

(Continued)

*Primary Examiner* — Truc T Nguyen
(74) *Attorney, Agent, or Firm* — Laurence A. Greenberg; Werner H. Stemer; Ralph E. Locher

(57) ABSTRACT

An assembly secures a connector of an external power supply in a rail vehicle. The connector is enclosed by a housing and by a rotatably mounted flap. The flap and the housing each have a slot configured to receive a catch. The flap can have two positions: a first position, in which the flap covers the connector and thus prevents access to the connector, and a second position, in which access to the connector is possible. The flap supports a lock cylinder, which can be switched by a key into two states: in a first state, the key can be pulled out of the lock cylinder, and in a second state, the key is secured in the lock cylinder against removal. A catch is rotated into both slots or out of both slots by the lock cylinder.

3 Claims, 3 Drawing Sheets

(51) Int. Cl.
*B61C 3/00* (2006.01)
*B61C 17/00* (2006.01)
*H01R 13/447* (2006.01)

(52) U.S. Cl.
CPC ....... *B60L 2200/26* (2013.01); *H01R 2201/26* (2013.01)

(56) References Cited

U.S. PATENT DOCUMENTS

| | | | |
|---|---|---|---|
| 5,555,752 A | 9/1996 | Fitzpatrick | |
| 8,346,423 B2 | 1/2013 | Crombez | |
| 10,352,078 B2 * | 7/2019 | Geissenhoener | E05F 1/10 |
| 10,442,290 B2 * | 10/2019 | Khafagy | E06B 3/38 |
| 11,303,078 B2 * | 4/2022 | Hahn | H01R 13/5213 |
| 11,325,486 B2 * | 5/2022 | Nakanishi | B62D 25/105 |
| 11,476,613 B1 * | 10/2022 | Ismailov | B60R 25/001 |
| 2009/0024267 A1 | 1/2009 | Kawai | |
| 2010/0294674 A1 * | 11/2010 | Walker | E05B 17/142 70/63 |
| 2013/0252448 A1 * | 9/2013 | Schulte | H01R 13/6397 439/304 |
| 2014/0167693 A1 * | 6/2014 | Wood | B60L 50/52 320/109 |
| 2018/0110331 A1 * | 4/2018 | Mack | A47B 47/025 |
| 2018/0152007 A1 * | 5/2018 | Kroushl | H02B 1/306 |
| 2018/0215254 A1 * | 8/2018 | Jobst | H01R 13/447 |

FOREIGN PATENT DOCUMENTS

| | | |
|---|---|---|
| CN | 103204067 A | 7/2013 |
| CN | 204506587 U | 7/2015 |
| DE | 8232630 U1 | 2/1983 |
| FR | 3005794 A1 | 11/2014 |
| GB | 2165403 A | 4/1986 |
| RU | 163254 U1 | 7/2016 |
| RU | 179904 U1 | 5/2018 |

* cited by examiner

ASSEMBLY FOR SECURING AN ELECTRICAL EXTERNAL POWER SUPPLY CONNECTOR

BACKGROUND OF THE INVENTION

Field of the Invention

The invention relates to an assembly for securing a connector of an external power supply (external power supply socket) in a rail vehicle.

For a supply of external power to be carried out, a rail vehicle has at least one so-called external power supply socket. It is possible by means of the external power supply socket for an external current/voltage to be supplied at a voltage of 400 V.

In a rail vehicle, a plurality of external power supply sockets are provided on the rail vehicle to facilitate operability.

For safety reasons that are based on the specific implementation of the external power supply in the rail vehicle, it must be ensured that access by operating personnel to in each case only one external power supply socket is possible.

For this reason, each external power supply socket or each connector of an external power supply is provided with a mechanical securing means, as is described below:

The connector is at least partially enclosed by a housing, wherein the housing has a slot for receiving a catch. A flap is connected to the housing via a pivot pin such that the flap can be rotated between a first position and a second position. In the first position, the flap at least partially covers the connector and thus disables or prevents access by operating personnel to the connector. In the second position, the flap is positioned in such a way that access to the connector is possible.

The flap has a lock cylinder with key, wherein, in a first state of the lock cylinder, the key can be pulled out of the lock cylinder, and wherein, in a second state of the lock cylinder, the key is secured in the lock cylinder against removal.

The lock cylinder is designed to rotate a catch and is connected to this catch, wherein, in the first state of the lock cylinder, the catch completely engages in the slot in the housing in order to lock the flap in the first position. In the second state of the lock cylinder, the catch is not in engagement with the slot in the housing in order to unlock the flap in the first position and in order to allow the flap to be brought into the second position.

The movement of the flap is thus enabled or blocked via the lock cylinder with key. If the lock cylinder is brought from the first state (closed position) to the second state (open position) via the key, the catch is removed from the housing slot and the key is arrested in the lock cylinder. The flap can then, with arrested key, be brought from the first position into the second position.

A corresponding situation applies conversely: if the flap is brought from the second position into the first position, the lock cylinder can subsequently be brought via the key from the second state (open position) into the first state (closed position). Consequently, the catch is rotated into or brought into engagement with the housing slot. The flap is thus arrested in this position and the key can then be removed from the lock cylinder.

The key is identical for all lock cylinders of the external power supply sockets or connectors of the rail vehicle, but is present only once for each rail vehicle. This ensures that only one external power supply socket can be operated by operating personnel for each rail vehicle.

In the case of this known concept, it is, however, possible for the lock cylinder to be brought into the closed position with the flap open, with the result that the key can be pulled out. Consequently, the original principle of mechanically securing the external power supply socket can be circumvented—an improper and possibly life-threatening use of a second external power supply socket by operating personnel would thus be possible.

Documents RU 179904 U1 and FR 3005794 A1 disclose external power supplies.

SUMMARY OF THE INVENTION

It is therefore the object of the present invention to specify an improved assembly for securing an electrical external power supply connector for a rail vehicle in which the aforementioned risks of any improper use are prevented.

This object is achieved by the features of the independent claim. Advantageous developments are specified in the further claims.

According to the invention, the flap has a slot for receiving the catch, wherein, in the first position of the flap, the slot in the flap corresponds with the slot in the housing in such a way that, in the first state of the lock cylinder, the catch completely engages in the slot in the housing and in the slot in the flap, whereas, in the second position of the flap, the slot in the flap is designed and is arranged with respect to the slot in the housing in such a way that engagement of the catch in the slot in the housing is prevented.

This mechanical implementation effectively prevents the key from being pulled out of the lock cylinder as long as the flap is situated in the second position (access to the connector is possible). The catch cannot engage in the slot in the housing in this flap position, with the result that, by way of the blocked catch, the lock cylinder does not pass into the state in which it would be possible for the key to be pulled out of the lock cylinder.

The mechanical implementation of the invention can be realized inexpensively, with minimum effort and in a very space-saving manner.

On account of the simple realization, malfunctions are reliably avoided.

Using standard components, for example for the lock cylinder, allows costs to be saved.

In one advantageous development, both the housing and the flap consist of shaped sheet metal parts.

The present invention will be described in more detail below by way of example on the basis of a drawing.

DETAILED DESCRIPTION OF THE INVENTION

Figure 1:
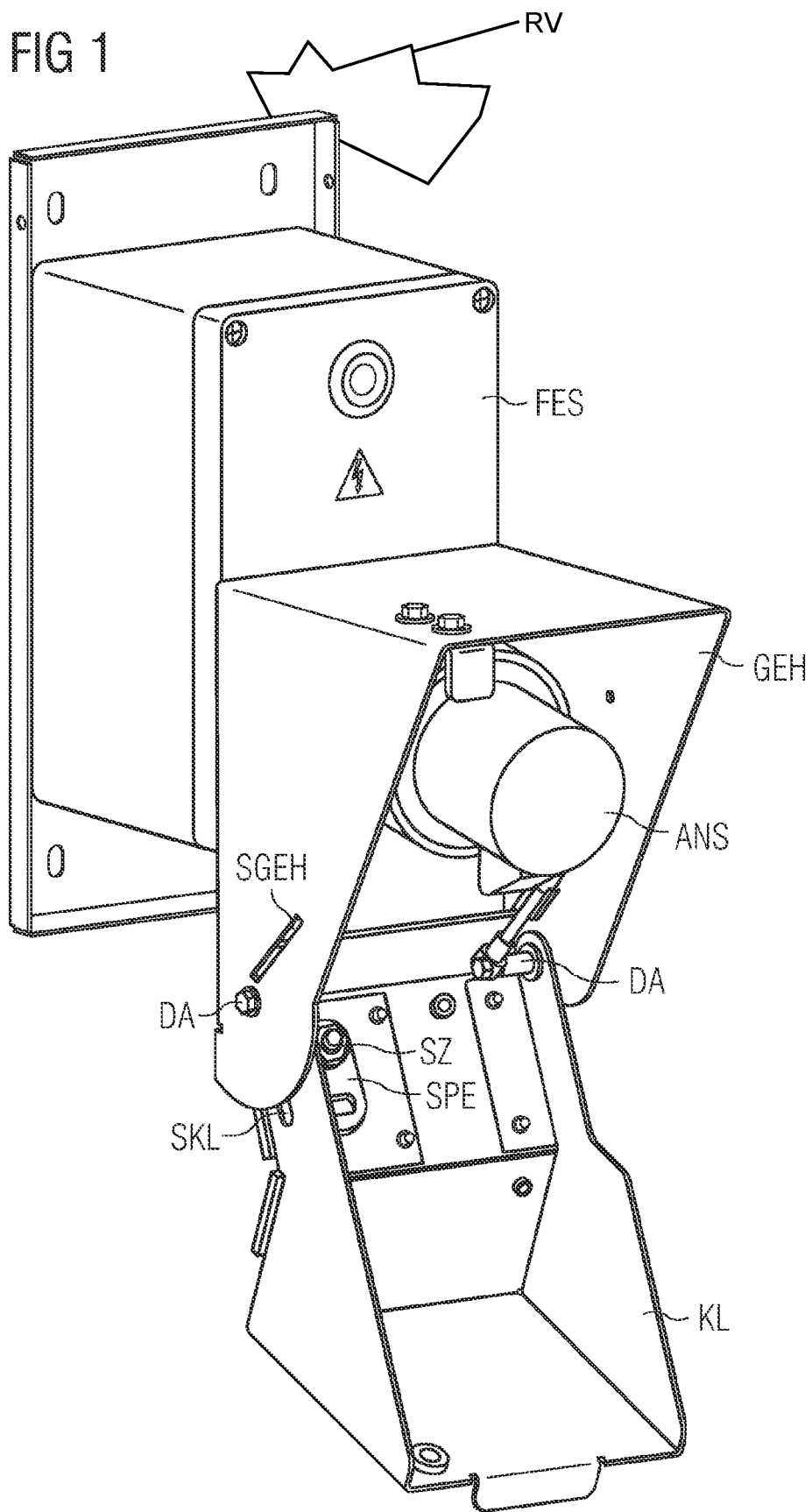
FIG. 1 shows the assembly according to the invention with open flap.

FIG. 1 shows the assembly according to the invention with open flap KL.

A connector ANS, which is provided on the rail vehicle RV as part of an external power supply FES, is at least partially enclosed by a housing GEH.

The housing GEH has a slot SGEH for receiving a catch, which is shown later.

A flap KL is connected to the housing GEH via a pivot pin DA, with the result that the flap can be rotated between a first position (closed position) which is shown later, and the second position (open position), which is shown here.

In the second position of the flap KL that is shown here, access to the connector ANS of the external power supply FES, for example by operating personnel, is possible.

The flap KL has a lock cylinder SZ, which is described in more detail later and which can be brought by means of a key (not shown here) into various states.

Figure 2:
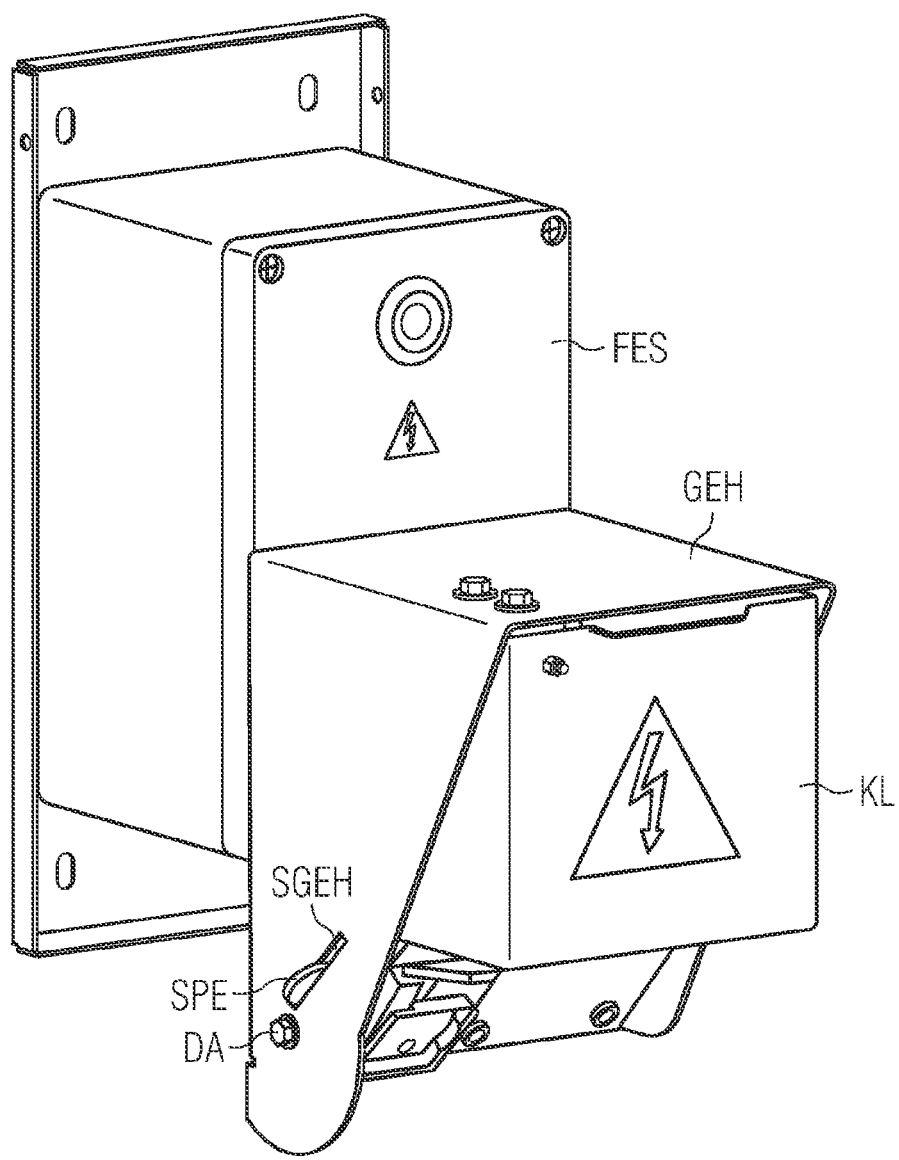
FIG. 2 shows the assembly according to the invention with closed flap.

In anticipation of and with reference to FIG. 2, the key can be pulled out of the lock cylinder SZ in a first state of the lock cylinder SZ.

In FIG. 1, the lock cylinder SZ is situated in a second state in which the key is secured in the lock cylinder SZ against removal and can thus not be pulled out.

The lock cylinder SZ is connected to a catch SPE and is designed to rotate the catch SPE.

The flap KL has a slot SKL for receiving the catch SPE.

In the second position of the flap KL (open position) that is shown here, the slot SGEH in the housing GEH is arranged with respect to the slot SKL in the flap KL in such a way that engagement of the catch SPE in the slot SGEH in the housing GEH is prevented.

As will be described in more detail below, the key can thus not be pulled out of the lock cylinder SZ in this position of the flap KL.

FIG. 2 shows, with reference to FIG. 1, the assembly according to the invention with closed flap KL.

Here, the flap KL is brought via the pivot pin DA into the first position (closed position), in which the flap KL at least partially covers the connector ANS shown in FIG. 1 and thus prevents access to the connector ANS.

In this position, the here concealed lock cylinder (FIG. 1, SZ) can have either a first state, in which the key can be pulled out of the lock cylinder, and the second state, in which the key is secured in the lock cylinder (FIG. 1, SZ) against removal.

Here, the lock cylinder (FIG. 1, SZ) is situated in the first state: the catch SPE completely engages both in the slot SGEH in the housing GEH and in the slot SKL in the flap KL. The flap KL is thus locked in this first position.

In order to achieve this, in the first position of the flap KL, the slot SKL in the flap KL corresponds in its configuration and in its position with the slot SGEH in the housing GEH such that, in the first state of the lock cylinder, the catch SPE completely engages in both slots SKL, SGEH.

For the sake of completeness, there will be briefly discussed the second state (which is not shown here) of the lock cylinder that is achieved by rotating the key:

The catch SPE would then be rotated and would not engage in the two slots SGEH and SKL, the flap KL would be unlocked in the first position and could be brought into the second position (open position).

Figure 3:
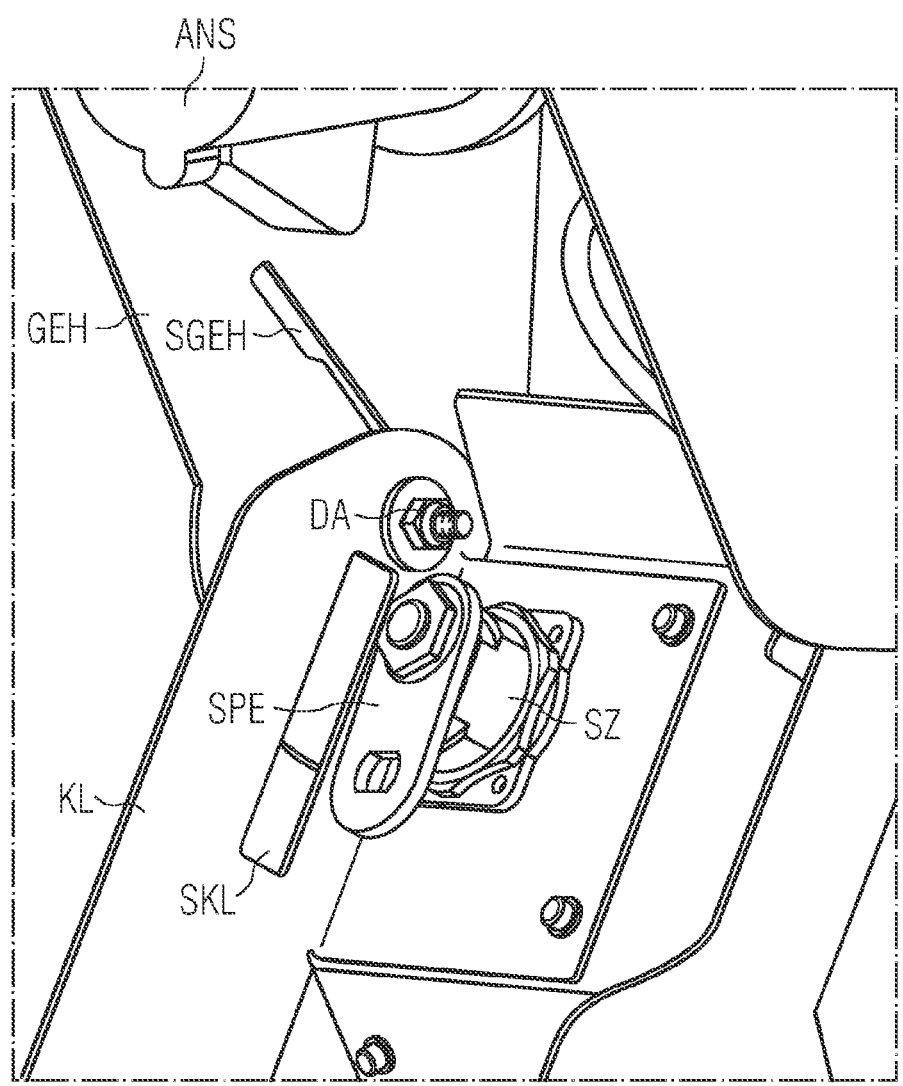
FIG. 3 shows the key components of the assembly according to the invention with open flap.

FIG. 3 shows, with reference to FIG. 1 and FIG. 2, the key components of the assembly according to the invention with open flap KL.

The flap KL is here in the second position, with the result that access to the connector is possible.

The flap KL has the lock cylinder SZ, wherein, in this position of the flap KL, as a result of the position and arrangement of the slots SGEH and SKL, the lock cylinder SZ is situated in the second state—i.e. the associated key is secured in the lock cylinder SZ against removal.

In this second position of the flap KL, the slot SKL in the flap KL does not correspond with the slot SGEH in the housing GEH—the two here at best only partially overlap, with the result that engagement of the catch SPE in the slot SGEH in the housing GEH is prevented.

By virtue of this blocking of the catch SPE, the lock cylinder SZ remains in the second state, with the result that the associated key is secured against removal.

The invention claimed is:

1. A rail vehicle, comprising:
an electrical external power supply connector;
an assembly securing said electrical external power supply connectors, said assembly containing:
  a housing at least partially enclosing a respective electrical external power supply connector of said electrical external power supply connectors, said housing having a housing slot formed therein for receiving a catch;
  a flap connected to said housing via a pivot pin such that said flap can rotate between a first position and a second position, wherein, in the first position, said flap at least partially covers said respective electrical external power supply connector and thus prevents access to said respective electrical external power supply connector, and wherein, in the second position, said flap allows access to said respective electrical external power supply connector;
  a catch;
  said flap having a lock cylinder with a key, wherein, in a first state of said lock cylinder, said key can be pulled out of said lock cylinder, and wherein, in a second state of said lock cylinder, said key is secured in said lock cylinder against removal, said lock cylinder configured to rotate said catch and is connected thereto;
  wherein, in the first state of said lock cylinder, said catch completely engages in said housing slot in order to lock said flap in the first position;
  wherein, in the second state of said lock cylinder, said catch is not in engagement with said housing slot in order to unlock said flap in the first position and in order to allow said flap to be brought into the second position;
  said flap having a flap slot formed therein for receiving said catch, and in the first position of said flap, said flap slot aligning with said housing slot in such a way that, in the first state of said lock cylinder, said catch completely engages in said housing slot and in said flap slot; and
  in the second position of said flap, said flap slot not being aligned with said housing slot in such a way that engagement of said catch in said housing slot is prevented, with a result that said lock cylinder remains in the second state.

2. The rail vehicle according to claim 1, wherein said housing and/or said flap is/are fabricated from steel sheet.

3. The rail vehicle according to claim 1, wherein the rail vehicle is a locomotive.

* * * * *